US012388655B2

(12) United States Patent
Dolzhenko et al.

(10) Patent No.: US 12,388,655 B2
(45) Date of Patent: Aug. 12, 2025

(54) DATA PROCESSING SYSTEMS

(71) Applicant: Arm Limited, Cambridge (GB)

(72) Inventors: Vladimir Dolzhenko, Loughborough (GB); Håkan Lars-Göran Persson, Bjärred (SE)

(73) Assignee: Arm Limited, Cambridge (GB)

( * ) Notice: Subject to any disclaimer, the term of this patent is extended or adjusted under 35 U.S.C. 154(b) by 209 days.

(21) Appl. No.: 18/361,261

(22) Filed: Jul. 28, 2023

(65) Prior Publication Data

US 2025/0038991 A1 Jan. 30, 2025

(51) Int. Cl.
*H04L 9/32* (2006.01)
*H04N 19/124* (2014.01)
*H04N 19/172* (2014.01)

(52) U.S. Cl.
CPC ......... *H04L 9/3247* (2013.01); *H04N 19/124* (2014.11); *H04N 19/172* (2014.11)

(58) Field of Classification Search
CPC .......................... H04N 19/124; H04N 19/172
See application file for complete search history.

(56) References Cited

U.S. PATENT DOCUMENTS 10,366,026 B1 7/2019 Diamant et al.
2011/0078222 A1 3/2011 Wegener
2012/0281007 A1 11/2012 Nystad et al.
2013/0036290 A1 2/2013 Nystad et al.
2013/0198485 A1 8/2013 Nystad et al.
2014/0208003 A1 7/2014 Cohen
2015/0220277 A1 8/2015 Lee et al.
2020/0119928 A1* 4/2020 Rubin .................. H04L 9/3247
2020/0366314 A1 11/2020 Romanovskii et al.
2022/0050599 A1 2/2022 Bjorling et al.

FOREIGN PATENT DOCUMENTS

GB 2519211 A 4/2015

OTHER PUBLICATIONS

Non-Final Office Action dated Mar. 3, 2025, U.S. Appl. No. 18/261,604, 13 pages.
Non-Final Office Action dated Oct. 1, 2024, U.S. Appl. No. 18/261,604, 27 pages.
Combined Search and Examination Report under Sections 17 and 18(3), dated Oct. 18, 2021, GB Patent Application No. GB2100858.6.
International Search Report and Written Opinion dated Mar. 11, 2022, International Application No. PCT/GB2022/050179.
U.S. Appl. No. 18/261,604, filed Jul. 14, 2023.
Response to Non-Final Office Action dated Dec. 4, 2024, U.S. Appl. No. 18/261,604, 13 pages.

* cited by examiner

*Primary Examiner* — Brian Whipple
(74) *Attorney, Agent, or Firm* — Pearl Cohen Zedek Latzer Baratz LLP

(57) ABSTRACT

A data processing system that comprises an encoder, and a communication system is disclosed. Compressed data produced by the encoder is decompressed to produce first decompressed data, and a first signature representative of the first decompressed data is generated. Compressed data that has been transferred by the communication system is decompressed to produce second decompressed data, and a second signature representative of the second decompressed data is generated. The first signature and the second signature are compared, and the comparison is used to determine whether an error has occurred.

19 Claims, 10 Drawing Sheets

1, 2, 3, 10
20
6
IP
Codec
Memory
Request read of uncompressed data 400
Read header 401
Read compressed body data 402
Decompress data, generate checksum, compare checksums 403
Return decompressed data, read complete 404

DATA PROCESSING SYSTEMS

BACKGROUND

The technology described herein relates to data processing systems, and in particular to compression and decompression in data processing systems, such as graphics processing systems.

A graphics processor (graphics processing unit (GPU)) typically performs graphics processing operations by processing data in an uncompressed form. When such operations have produced a particular output (e.g. frame), the output data may be written to memory for storage before further processing by the graphics processor.

To reduce the amount of data that needs to be transferred to and from memory, and the associated power cost of moving such data back and forth, the data may be compressed before being written to memory. This allows the data to be stored in a compressed format. Then, when the graphics processor requires the data for further processing, the compressed data is read from memory and decompressed, such that it is then in a suitable format for processing by the graphics processor.

The Applicants believe that there remains scope for improvements to compression and decompression arrangements in data processing systems.

BRIEF DESCRIPTION OF THE DRAWINGS

Embodiments of the technology described herein will now be described by way of example only and with reference to the accompanying drawings, in which.

Like reference numerals are used for like components where appropriate in the drawings.

DETAILED DESCRIPTION

Figure 1:
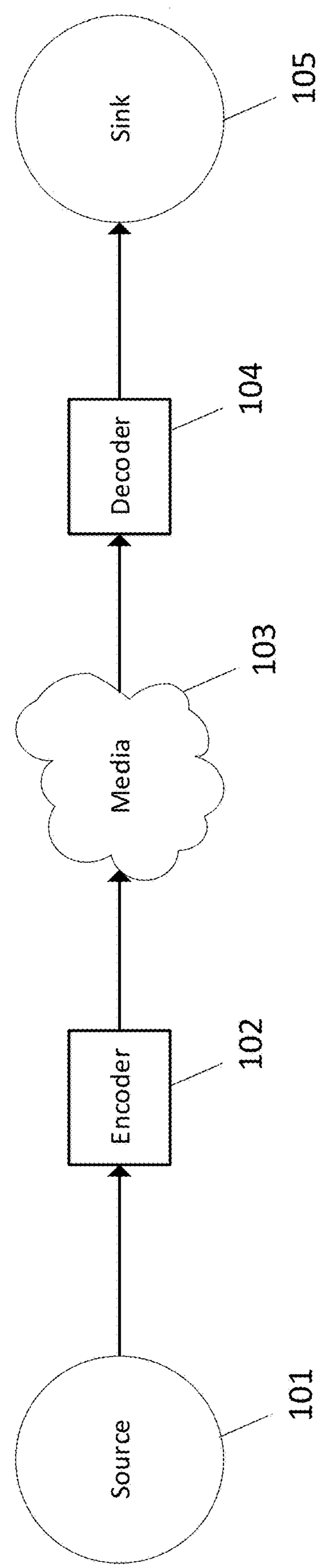
FIG. 1 shows schematically a data transfer process.

A first embodiment of the technology described herein comprises a method of operating a data processing system that comprises:

an encoder operable to compress data; and a communication system operable to transfer data compressed by the encoder;

the method comprising:

the encoder compressing data to produce compressed data;

decompressing compressed data produced by the encoder to produce first decompressed data;

generating a first signature representative of the first decompressed data;

the communication system transferring compressed data produced by the encoder;

decompressing compressed data that has been transferred by the communication system to produce second decompressed data;

generating a second signature representative of the second decompressed data;

comparing the first signature and the second signature; and using the comparison to determine whether an error has occurred.

A second embodiment of the technology described herein comprises a data processing system comprising:

an encoder operable to compress data; and a communication system operable to transfer data compressed by the encoder;

wherein the data processing system is operable to:

decompress compressed data produced by the encoder to produce first decompressed data;

generate a first signature representative of the first decompressed data;

decompress compressed data that has been transferred by the communication system to produce second decompressed data;

generate a second signature representative of the second decompressed data;

compare the first signature and the second signature; and use the comparison to determine whether an error has occurred.

The technology described herein relates to a data processing system in which data can be transferred in compressed form via a communication system. In embodiments, the data processing system includes one or more processing units, and data that is, e.g. and in embodiments, generated by a processing unit of the one or more processing units is compressed by the encoder, and then transferred in compressed form via the communication system, and then decompressed, and then provided in decompressed form to a processing unit of the one or more processing units. The processing unit may then process the decompressed data.

In the technology described herein, compressed data produced by the encoder is decompressed (logically) prior to the compressed data being transferred via the communication system to produce first decompressed data. Compressed data produced by the encoder is transferred via the communication system, and then compressed data that has been transferred via the communication system is decompressed (logically) after the compressed data has been transferred via the communication system to produce second decompressed data. A first signature (e.g. checksum) representative of the first decompressed data is generated, a second signature (e.g. checksum) representative of the second decompressed data is generated, the signatures are compared, and the comparison is used to determine whether an error has occurred. For example, and in embodiments, it is determined that an error has occurred when the signatures (e.g. checksums) do not match, and it is determined that an error has not occurred when the signatures (e.g. checksums) match.

As will be discussed in more detail below, the inventors have realised that it can be desirable to implement error detection when transferring compressed data in a data processing system, even where the data is compressed in a lossy manner. The inventors have realised, however, that typical checksum arrangements in which a checksum generated from initial uncompressed data values is compared with a checksum that is generated from decompressed data values can preclude the use of lossy compression, where it is to be expected that decompressed data values will differ from initial uncompressed data values.

In the technology described herein, in contrast, signatures (e.g. checksums) generated from decompressed data values are compared. This can facilitate error detection even in the case of lossy compression. The technology described herein can accordingly allow lossy compression to be used in safety critical applications, such as in automotive applications. For example, and in embodiments, the data processing system may perform safety critical processing, such as for an automotive advanced driver assistance system (ADAS). Furthermore, the technology described herein allows compression errors to be detected, in addition to errors in data transfer and decompression.

It will be appreciated, therefore, that the technology described herein provides an improved data processing system.

The data processing system should, and in embodiments does, include one or more processing units that generate and/or process data transferred by the communication system. The one or more processing units can be any suitable processing units. The one or more processing units may comprise one or more, or all, of: a central processing unit (CPU), a graphics processing unit (GPU) (graphics processor), a video processor, a sound processor, an image signal processor (ISP), a digital signal processor (DSP), a neutral network processor, a display controller, and an (automotive) electronic control unit (ECU). Other processing units would be possible.

In embodiments, the one or more processing units include at least one "source" processing unit that generates data that is to be compressed and transferred by the communication system and/or at least one "consumer" processing unit that processes data decompressed from compressed data that has been transferred by the communication system. The same processing unit may operate as both a source processing unit and a consumer processing unit, or different processing units may operate as source and consumer processing units.

The data that is compressed and transferred can be any suitable data. It may comprise image data, texture data, graphics processing fragment or vertex data, video data, sound data, neural network data, etc.

The communication system is operable to transfer such data in compressed form, e.g. between the one or more processing units. To facilitate this, the system should, and in embodiments does, comprise an encoder and a decoder.

The encoder should be, and in embodiments is, operable to receive (the) (uncompressed) data (e.g. generated by a processing unit), compress the (uncompressed) data to produce compressed data, and provide the compressed data to the communication system for transfer.

Correspondingly, the decoder should be, and in embodiments is, operable to receive compressed data from the communication system, decompress the compressed data to produce (the second) decompressed data, and e.g. provide the decompressed data to a processing unit, which may then process the decompressed data provided to it. The data may be generated by and provided to (and processed by) the same processing unit or different processing units of the one or more processing units.

An (the) encoder and decoder may comprise separate circuits, or may be at least partially formed of shared processing circuits. In embodiments, the system comprises a codec comprising the encoder and the decoder.

In the technology described herein, compressed data is decompressed both (logically) prior to, and following, transfer by the communication system. The same decoder may decompress compressed data prior to transfer and decompress compressed data following transfer, or different decoders may decompress compressed data prior to transfer and decompress compressed data following transfer. The system may thus comprise one or more, such as plural, decoders.

The (each) encoder and decoder should be, and in an embodiment are, configured to compress and decompress data in accordance with a suitable encoding scheme (or schemes). A lossless encoding scheme may be used. In embodiments a lossy encoding scheme is used. The encoding scheme may, for example, comprise Adaptive Scalable Texture Compression (ASTC), e.g. as described in US 2012/0281007, the entire contents of which is hereby incorporated by reference. Other lossy encoding schemes could be used, such as Arm Fixed Rate Compression (AFRC), e.g. as described in WO 2020/115471, the entire contents of which is hereby incorporated by reference, VESA DDC display data compression, MIPI CSI-2 camera data compression, JPEG, H.264, etc.

In embodiments, the data compression involves lossily compressing data to produce lossily compressed data, and then losslessly compressing the lossily compressed data. The losslessly encoded data may then be transferred by the communication system, and then decompressed (by lossless, and then lossy, decompression). For example, and in embodiments, the data compression comprises lossily compressing the data by transforming (e.g. by discrete cosine transformation (DCT), wavelet transformation, or another transformation) and then quantizing the transformed data, and then losslessly entropy encoding the quantized data for transfer. For example, image data may be compressed by JPEG compression, and then entropy encoded for transfer.

In these embodiments, the decompression of encoder produced compressed data, and the generation of the first signature, may be performed (logically) following the lossy compression, but (logically) prior to the lossless compression. The first signature may thus represent lossily decompressed data. Corresponding, the generation of the second signature may be performed (logically) following lossy decompression. This can facilitate error detection over more of the data path.

In embodiments, the data compression involves decompressing data, and the decompression of encoder produced compressed data is performed as part of the data compression performed by the encoder. For example, and in embodiments, the data compression comprises video compression in which a current frame is encoded by decompressing a previous encoded frame and comparing the current frame with the decompressed previous encoded frame.

In these embodiments, the generation of the first signature may be performed using decompressed data that is produced as part of the encoding process. This then means that the decompressed data can be effectively obtained for "free" as part of the encoding process, without the need for an additional decompression step.

The communication system can be any suitable system that can transfer data, e.g. and in embodiments, between the one or more processing units. The communication system may comprise one or more, or all, of: a communication bus (e.g. interconnect), storage (e.g. memory) and a network. The communication system may transfer data by writing data to the storage (e.g. memory), and/or reading data from the storage (e.g. memory).

The memory can be any suitable and desired storage for storing any suitable (e.g. compressed and/or uncompressed (not compressed)) data that the data processing system uses and/or produces. There could be one or more, e.g. plural, different memories. In embodiments, the memory is a main (system) memory of the data processing system.

In embodiments, the communication system comprises a communication bus (e.g. interconnect) that can transfer data between the one or more processing units and a memory. In embodiments, the data transfer and checksum comparison process is triggered by a processing unit(s) initiating bus transactions on the bus (interconnect). A processing unit may initiate bus transactions substantially as described in WO 2022/157510, the entire contents of which is hereby incorporated by reference. Thus, in embodiments, data transfer involves a processing unit(s) initiating bus transactions in which the (compression) codec accesses the memory.

In embodiments, in response to a processing unit issuing a write transaction request on the bus: the encoder compresses data generated by the processing unit to produce compressed data; compressed data produced by the encoder is decompressed to produce the first decompressed data; the first signature representative of the first decompressed data is generated; and compressed data produced by the encoder and the first signature are stored in the memory. In embodiments, in response to a processing unit issuing a read transaction request on the bus: the compressed data and the first signature stored in the memory are read; the read compressed data is decompressed to produce the second decompressed data; the second signature representative of the second decompressed data is generated; the first signature and the second signature are compared; and the comparison is used to determine whether an error has occurred.

Compressed data may be transferred in any suitable form. In embodiments, compressed data is stored (e.g. in the memory) in association with a header, with the compressed data being "body" data associated with (and for) its respective header. The header information may include any suitable information, e.g. a memory address of the associated body data. The header data may, for example and in an embodiment, include the size of the associated body data. In embodiments, the first signature is transferred via the communication system together with the associated compressed data, e.g. and in embodiments, in the header.

A signature representative of decompressed data can be any suitable signature. A "signature" is representative of associated decompressed data, and is in embodiments indicative of and derived from, or based on, decompressed data values. Such a signature may comprise, e.g., and in an embodiment, any suitable set of derived information that can be considered to be representative of the decompressed data values, such as a checksum, a CRC, a hash value, a cryptographic hash, etc., derived from the decompressed data values. Suitable signatures would include standard CRCs, such as CRC32, or other forms of signature such as MD5, SHA 1, etc.

A comparison of signatures can be used to determine whether an error has occurred in any suitable and desired manner. For example, it may be determined that no error has occurred when the signatures exactly match, and it may be determined that there has been an error when the signatures do not exactly match. Alternatively, it may be determined that no error has occurred when the signatures are sufficiently similar, and it may be determined that there has been an error when the signatures are not sufficiently similar. The comparison may be performed by the decoder, e.g. codec.

An error may occur, for example, due to an error in the compression or decompression process, due to a corruption of, or overwriting of, stored compressed data, or due to an error in transporting data over the communication system, etc. If it is determined that an error has occurred, the decompressed data may be not provided to a processing unit, or the decompressed data may be provided to a processing unit with an indication that an error has occurred, e.g. with the processing unit then taking an appropriate action, such as not processing the data. Thus, when it is determined that an error has occurred, the (e.g. second) decompressed data may not be processed by a processing unit of the one or more processing units, and when it is not determined that an error has occurred (when it is determined that an error has not occurred), the (e.g. second) decompressed data may be processed by a processing unit of the one or more processing units.

The technology described herein can be implemented in any suitable system, such as a suitably operable microprocessor based system. In some embodiments, the technology described herein is implemented in a computer and/or micro-processor based system. The technology described herein may be implemented in a portable device, such as, and in embodiments, a mobile phone or tablet.

In embodiments, the technology described herein is implemented in a data processing system that performs safety critical data processing operations. For example, the technology described herein may be implemented in automotive, e.g. advanced driver assistance system (ADAS), applications. Other safety critical applications are possible, such as in robotics, aerospace and medical applications.

The technology described herein is applicable to any suitable form or configuration of processing unit and data processing system, such as graphics processors and systems. It may be applicable, for example, to tile-based graphics processors and graphics processing systems. Thus, the processing unit may be a tile-based graphics processor.

In embodiments, the various functions of the technology described herein are carried out on a single data processing platform that generates and outputs data, for example for a display device.

As will be appreciated by those skilled in the art, the data (e.g. graphics) processing system may include, e.g., and in embodiments, a host processor that, e.g., executes applications that require processing by the (e.g. graphics) processing unit. The host processor will send appropriate commands and data to the (e.g. graphics) processing unit to control it to perform data (e.g. graphics) processing operations and to produce data (e.g. graphics) processing output required by applications executing on the host processor. To facilitate this, the host processor should, and in embodiments does, also execute a driver for the processing unit and optionally a compiler or compilers for compiling (e.g. shader) programs to be executed by (e.g. an (programmable) execution unit of) the processing unit.

The processing unit may also comprise, and/or be in communication with, one or more memories and/or memory devices that store the data described herein, and/or store software (e.g. (shader) program) for performing the processes described herein. The processing unit may also be in communication with a host microprocessor, and/or with a display for displaying images based on data generated by the processing unit.

The technology described herein can be used for all forms of input and/or output that a data (e.g. graphics) processor may use or generate. For example, the (e.g. graphics) processing unit may execute a graphics processing pipeline that generates frames for display, render-to-texture outputs, etc. The output data values from the processing are in embodiments exported to external, e.g. main, memory, for storage and use, such as to a frame buffer for a display.

The various functions of the technology described herein can be carried out in any desired and suitable manner. For example, the functions of the technology described herein can be implemented in hardware or software, as desired. Thus, for example, the various functional elements, stages, units, and "means" of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

It should also be noted here that the various functions, etc., of the technology described herein may be duplicated and/or carried out in parallel on a given processor. Equally, the various processing stages may share processing circuits/circuitry, etc., if desired.

Furthermore, any one or more or all of the processing stages or units of the technology described herein may be embodied as processing stage or unit circuits/circuitry, e.g., in the form of one or more fixed-function units (hardware) (processing circuits/circuitry), and/or in the form of programmable processing circuitry that can be programmed to perform the desired operation. Equally, any one or more of the processing stages or units and processing stage or unit circuits/circuitry of the technology described herein may be provided as a separate circuit element to any one or more of the other processing stages or units or processing stage or unit circuits/circuitry, and/or any one or more or all of the processing stages or units and processing stage or unit circuits/circuitry may be at least partially formed of shared processing circuit/circuitry.

Subject to any hardware necessary to carry out the specific functions discussed above, the components of the data processing system can otherwise include any one or more or all of the usual functional units, etc., that such components include.

It will also be appreciated by those skilled in the art that all of the described embodiments of the technology described herein can include, as appropriate, any one or more or all of the optional features described herein.

The methods in accordance with the technology described herein may be implemented at least partially using software e.g. computer programs. Thus, further embodiments of the technology described herein comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus further embodiments of the technology described herein comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

A number of embodiments of the technology described herein will now be described.

Data compression can be used to reduce data transmission requirements. FIG. 1 shows schematically a typical compression process in which sink 105 consumes data generated by source 101, and data is passed from source 101 to sink 105 via media 103. The media 103 (communication system), may for example, comprise a local bus, SRAM/DRAM storage, network connection, flash/HDD/storage card, RF link, cloud storage, etc. The data may, for example, comprise image/video data, audio data, depth/radar/lidar data, 3D geometry data, RF samples or spectrum data, neural network (NN) activations data, etc.

As shown in FIG. 1, in order to reduce the amount of data that needs to be transferred via media 103, data generated by source 101 is compressed by encoder 102, and transferred in compressed form via media 103. The data in compressed form is then decompressed by decoder 104 before being provided to sink 105.

Figure 2:
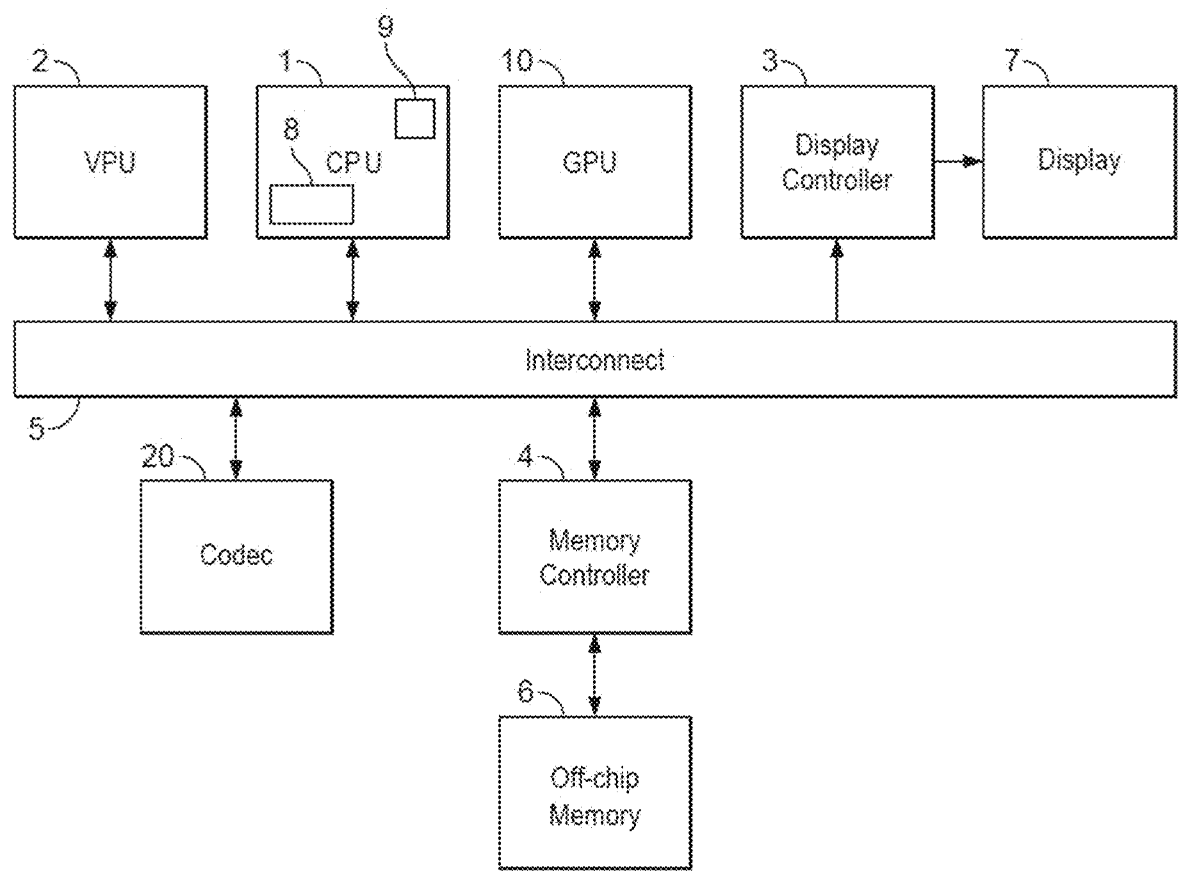
FIG. 2 shows schematically a data processing system in accordance with embodiments.

FIG. 2 illustrates a data processing system in accordance with an embodiment. The exemplary data processing system shown in FIG. 2 comprises a host processor comprising a central processing unit (CPU) 1, a graphics processor (graphics processing unit (GPU)) 10, a video processing unit (VPU) 2, a display controller 3, and a compression codec 20. As shown in FIG. 2, these processing units can communicate via a bus 5 and have access to an off-chip memory system (memory) 6 via the bus 5 and a memory controller 4. Other processing units may be provided.

In use of this system, the CPU 1, and/or VPU 2 and/or GPU 10 will generate frames (images) to be displayed, and the display controller 3 will provide frames to a display 7 for display. To do this the CPU 1, and/or VPU 2 and/or GPU 10 may read in data from the memory 6 via the interconnect 5, process that data, and return data to the memory 6 via the interconnect 5. The display controller 3 may then read in that data from the memory 6 via the interconnect 5 for display on the display 7. The CPU 1, VPU 2, GPU 10 or display controller 3 can thus act as a sink that consumes data generated by a source processing unit, e.g. CPU 1, VPU 2 or GPU 10, with data being transferred between source and sink via interconnect 5 and memory 6 (media).

In this embodiment, an application 8, such as a game, executing on the host processor (CPU) 1 may require the display of graphics processing unit rendered frames on the display 7. In this case, the application 8 will send appropriate commands and data to a driver 9 for the graphics processing unit 10 that is executing on the CPU 1. The driver 9 will then generate appropriate commands and data to cause the graphics processing unit 10 to render appropriate frames for display and store those frames in appropriate frame buffers in main memory 6. The display controller 3 will then read those frames into a buffer for the display from where they are then read out and displayed on the display panel of the display 7.

As part of this processing, the graphics processor 10 will read in data, such as textures, geometry to be rendered, etc. from the memory 6, process that data, and then return data to the memory 6 (e.g. in the form of processed textures and/or frames to be displayed), which data will then further, e.g. as discussed above, be read from the memory 6, e.g. by the display controller 3, for display on the display 7.

Thus, in this system, there is a need to transfer data between the memory 6 and processing units (e.g. CPU 1, VPU 2, GPU 10, display controller 3) of the data processing system. In order to facilitate this, and to reduce the amount of data that needs to be transferred to and from memory during processing operations, the data may be stored in a compressed form in the memory 6.

As a processing unit (e.g. CPU 1, VPU 2, GPU 10, display controller 3) will typically need to operate on the data in an uncompressed form, this accordingly means that data that is stored in the memory 6 in compressed form may need to be decompressed before being processed by the processing unit. Correspondingly, data produced by a processing unit (e.g. CPU 1, VPU 2, GPU 10) may need to be compressed before being stored in the memory 6.

To facilitate such compression and decompression of data that passes between the memory 6 and processing units, as shown in FIG. 2, the data processing system includes a compression codec 20 that performs the required compression and decompression operations. In this embodiment, the codec 20 operates as encoder 102 and decoder 104, and is connected to the bus 5 via a bus interface. In other embodiments, the codec may be integrated in the bus 5 or in a processing unit, or provided elsewhere in the system. In other embodiments, a separate encoder and decoder may be provided.

Figure 3:
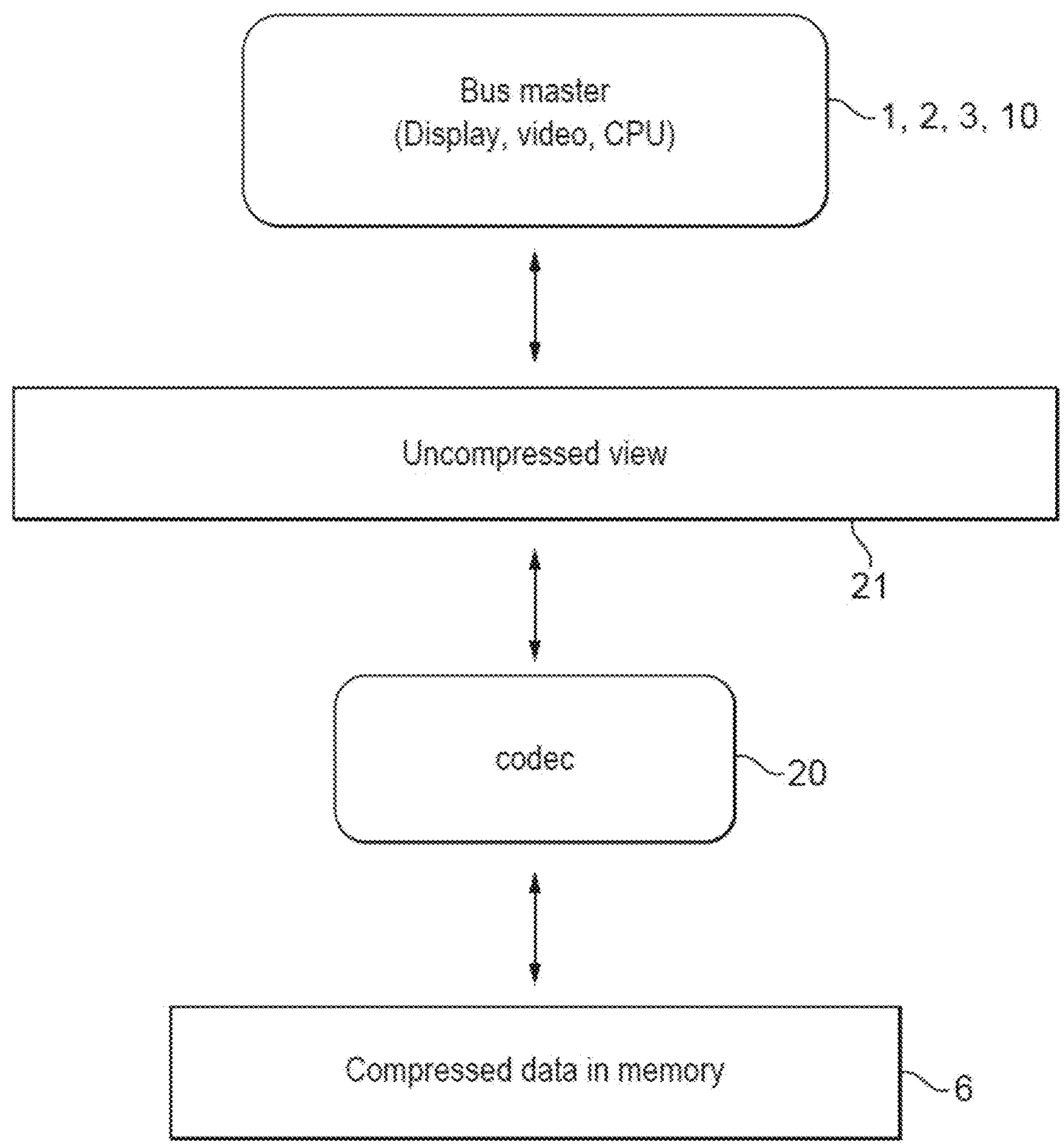
FIG. 3 shows schematically a data processing system operating in accordance with embodiments.

FIG. 3 shows schematically the transferring of data between the memory system 6 and a processing unit in a compressed form. As shown in FIG. 3, the codec 20 is logically between the processing unit (e.g. CPU 1, VPU 2, GPU 10, display controller 3) and the memory 6. The codec 20 is then operable to decompress data received from the memory system 6 before providing that data in an uncompressed form for use by a processing unit, and, conversely, to compress data received from a processing unit 1, 2, 3, 10 that is to be written to the memory system 6 prior to writing that data to the memory 6 in compressed form.

As illustrated in FIG. 3, in the present embodiment, the codec 20 operates to effectively present an uncompressed view 21 of compressed data in the memory 6 to a processing unit 1, 2, 3, 10 that is acting as bus master, such that the processing unit 1, 2, 3, 10 can access that uncompressed view of the compressed data through bus transactions.

Figure 4:
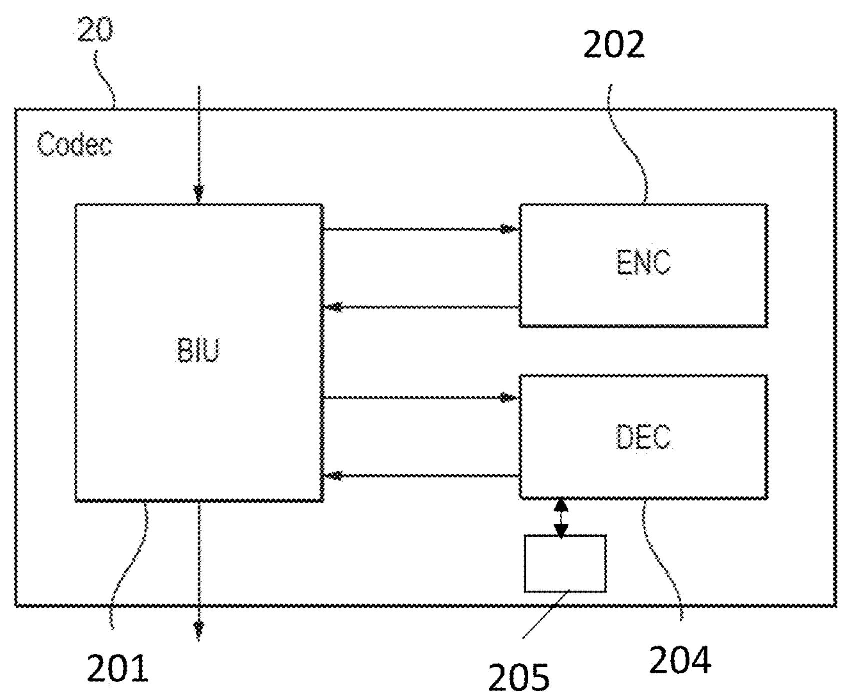
FIG. 4 shows schematically a codec unit in accordance with embodiments.

FIG. 4 shows the codec unit 20 in more detail according to an embodiment. As shown in FIG. 4, the codec unit 20 includes a bus interface module (BIU) 201, an encoder module 202, a decoder module 204, and a checksum module 205. The bus interface module 201 receives bus transactions via the bus 5 and determines the manner in which the codec 20 should respond to received bus transactions.

In the case of a compressed data read transaction, the bus interface module 201 passes compressed data to be decompressed to the decoder module 204, and the decoder module 204 decompresses the data, and returns decompressed data to the bus interface module 201. The bus interface module 201 then forwards the decompressed data to the requesting processing unit 1, 2, 3, 10. The bus interface module 201 may initiate a bus transaction to read the compressed data to be decompressed from the memory 6.

In the case of a compressed data write transaction, the bus interface module 201 passes data to be compressed to the encoder module 202, and the encoder module 202 compresses the data, and returns compressed data to the bus interface module 201. The bus interface module 201 then forwards the compressed data to the memory 6. The bus interface module 201 may initiate a bus transaction to write the compressed data to the memory 6.

In the case of a bus transaction that is not indicated as being related to compressed data, the bus interface module 201 may appropriately forwards the bus transaction without the encoder or decoder modules 202, 204 being activated.

The use of bus transactions to communicate with and control a codec in this manner can provide a particularly flexible arrangement for compression and decompression in a data processing system. In embodiments, the arrangement is substantially as described in WO 2022/157510.

In this system, the checksum module 20 may facilitate a checksum arrangement to detect errors.

Figure 5:
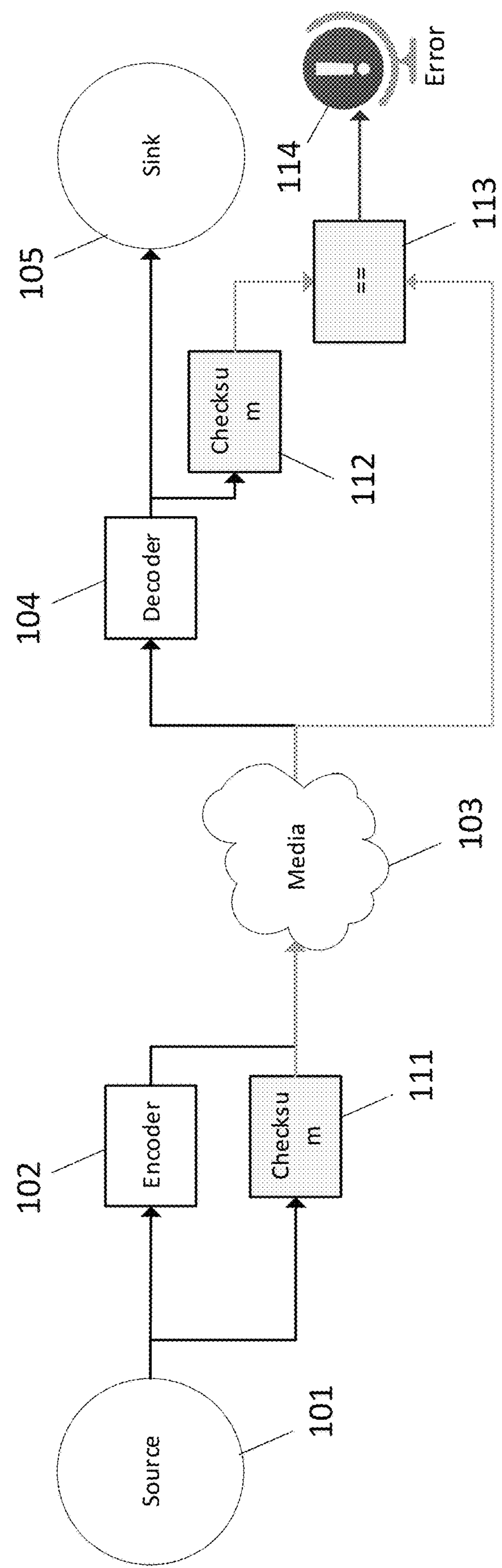
FIG. 5 shows schematically a checksum process.

FIG. 5 illustrates a typical checksum arrangement in which a checksum 111 is generated from uncompressed data values generated by source 101 (e.g. processing unit 1, 2, 10), and the uncompressed data values are compressed by the encoder 102 (e.g. encoder 202) to produce compressed data. The checksum and compressed data are transferred to sink 105 (e.g. processing unit 1, 2, 3, 10) via media 103 (e.g. interconnect 5 and memory 6).

As shown in FIG. 5, the compressed data is decompressed by the decoder 104 (e.g. decoder 204) to produce decompressed data values, and the checksum is re-generated 112 from the decompressed data values. The checksum 112 generated from the decompressed data values is then compared 113 with the checksum 111 generated from the uncompressed data values, and the comparison 113 is used to determine whether an error 114 has occurred.

In this arrangement, it is determined that an error 114 has occurred when the checksum 112 generated from the decompressed data values is not equal to the checksum 111 generated from the uncompressed data values. This can allow detection of errors in the case of a lossless compression process. However, the inventors have recognised that in the case of a lossy compression process, it is to be expected that a checksum 112 generated from decompressed data values will not be (exactly) equal to a checksum 111 generated from uncompressed data values, even when an error has not occurred. Accordingly, in the case of lossy compression, the checksum arrangement of FIG. 5 may falsely determine that an error has or has not occurred.

Figure 6:
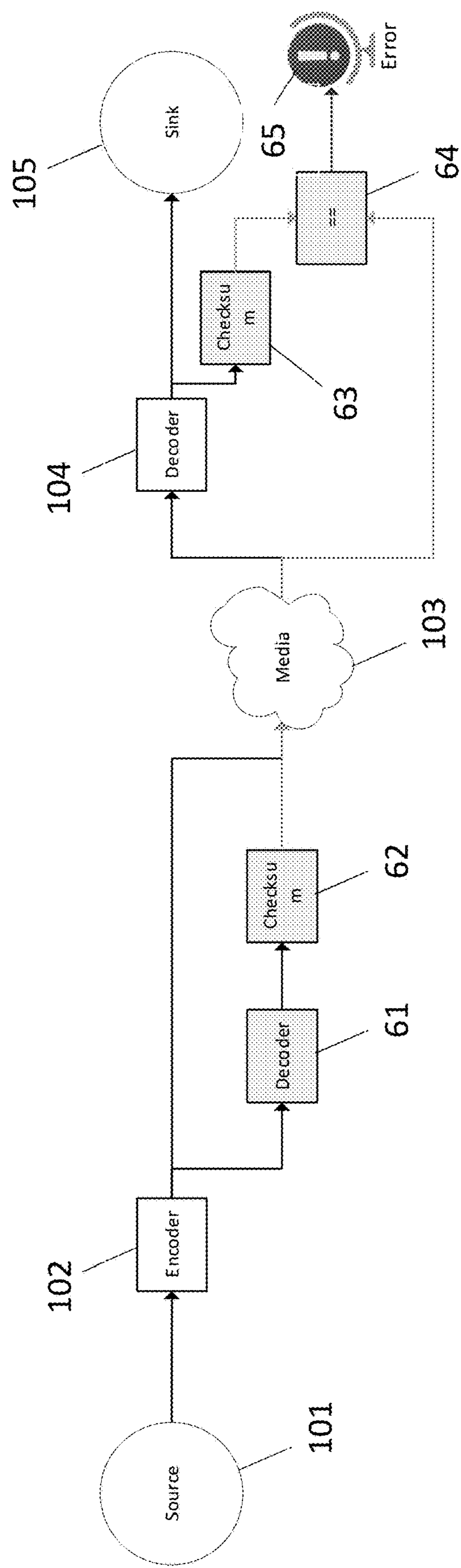
FIG. 6 shows schematically a checksum process in accordance with embodiments.

FIG. 6 illustrates a checksum arrangement in accordance with embodiments of the technology described herein. As shown in FIG. 6, uncompressed data values generated by source 101 (e.g. processing unit 1, 2, 10), are compressed by the encoder 102 (e.g. encoder 202) to produce compressed data. The compressed data is then decompressed by decoder 61 (e.g. decoder 204) to produce "source-side" decompressed data values, and a checksum is generated 62 from the source-side decompressed data values (e.g. by checksum module 205). The checksum and compressed data are transferred to sink 105 (e.g. processing unit 1, 2, 3, 10) via media 103 (e.g. interconnect 5 and memory 6).

As show in FIG. 6, the compressed data is decompressed by decoder 104 (e.g. decoder 204) to produce "sink-side" decompressed data values, and the checksum is re-generated 63 from the sink-side decompressed data values (e.g. by checksum module 205).

The checksum 63 generated from the sink-side decompressed data values is then compared 64 with the checksum 62 generated from the source-side decompressed data values, and the comparison 64 is used to determine whether an error 65 has occurred (e.g. by checksum module 205). It is determined that an error 65 has occurred when the checksum 63 generated from the sink-side decompressed data values is not equal to the checksum 62 generated from the source-side decompressed data values.

Generating and comparing checksums representing decompressed data values in this manner facilitates the use of checksums for lossy compression. This can allow, for example, lossy compression to be used in safety critical, e.g. automotive, applications. For example, the technology described herein may be used when compressing video data generated by cameras of an advanced driver assistance system (ADAS), or for GPU dashboard rendering. Furthermore, the process of FIG. 6 allows the detection of errors in data compression, in addition to errors in data transmission and decompression.

FIG. 7 illustrates an embodiment in more detail, in which a processing unit 1, 2, 3, 10 and codec 20 access memory 6 using bus transactions. In these embodiments, compressed image data is stored in one or more compressed frame buffers in memory 6, with each compressed frame buffer comprising one or more memory pages of one or more compressed data blocks, e.g. as described in WO 2022/157510.

Figure 7A:
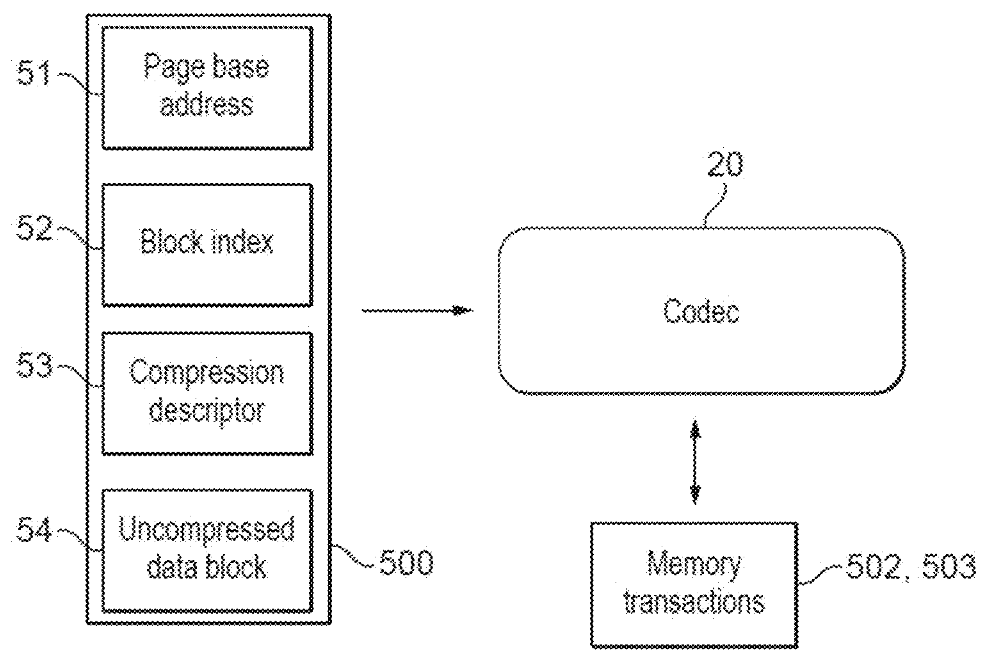
FIGS. 7A and 7B show schematically a compressed data write transaction process in accordance with embodiments.
Figure 7B:
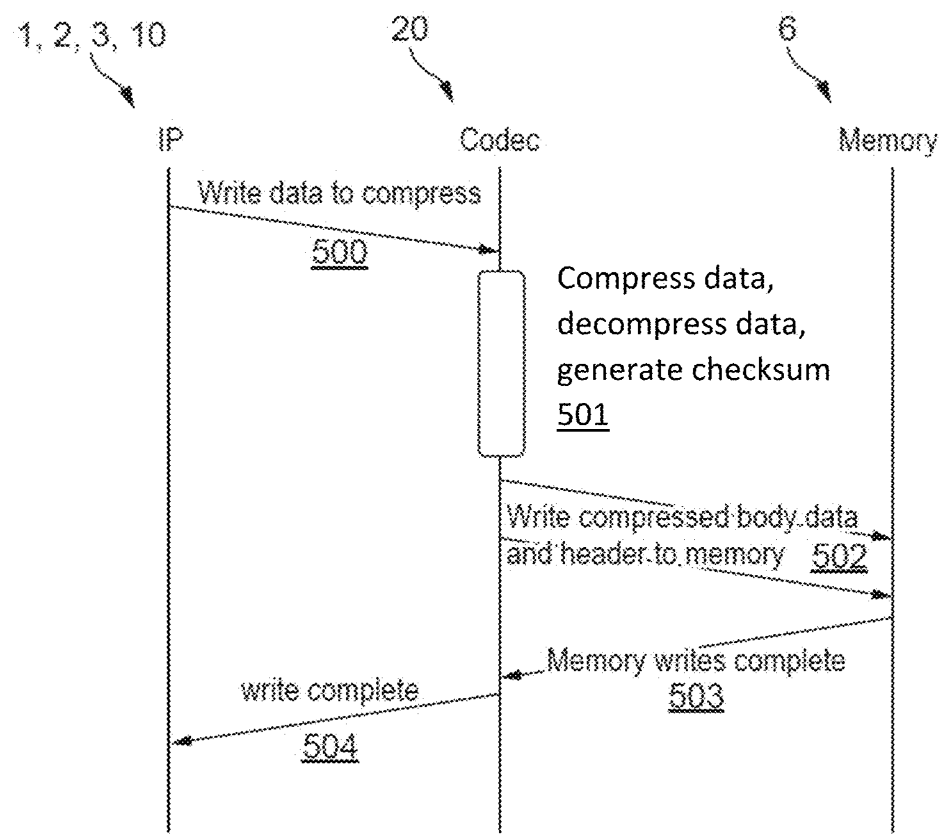

As illustrated in FIGS. 7A and 7B, in the present embodiment, when a processing unit 1, 2, 3, 10 has generated (uncompressed) data, the processing unit issues a write transaction request 500 on the bus 5 via its bus interface. This includes the processing unit issuing a "COMPRESSED" signal on a write address channel of the bus 5 that indicates that the request relates to compressed data in the memory 6, and should trigger a bus transaction that involves the codec 20.

As shown in FIG. 7A, the write transaction request 500 further includes the (uncompressed) data 54 that the processing unit requires to be stored in compressed form in the memory 6, an indication 51, 52 of a memory address at which a compressed data block should be stored in the memory 6, and a compression descriptor 53. The memory address information may include an indication 51 of the memory location for header data for the compressed data block, and an indication 52 of the memory location for a block within body data associated with the header.

The compression descriptor 53 may be a signal vector that identifies the compression mechanism (codec) that the data should be compressed in accordance with, and identifies the data format and data type in which the uncompressed data is provided (e.g. RGB, RGBA, YUV, number of components, bits per component, and whether data values are unsigned/signed integers, floating point numbers, etc.).

As shown in FIG. 7B, the codec 20 recognises and intercepts the request 500, and processes 501 the uncompressed data 54. The processing 501 involves the encoder 202 compressing the uncompressed data 54 in accordance with the compression descriptor information 53, the decoder 204 then decompressing the compressed data generated by the encoder 202, and then the checksum module 205 generating a checksum from the decompressed data values generated by the decoder 204. The codec 20 then writes 502 the compressed data block together with header information comprising the checksum to the memory 6 based on the memory address information 51, 52. When the memory write is complete 503, the codec 20 signals 504 to the processing unit 1, 2, 3, 10 that the write transaction is complete on a write response channel of the bus 5.

Figure 7C:
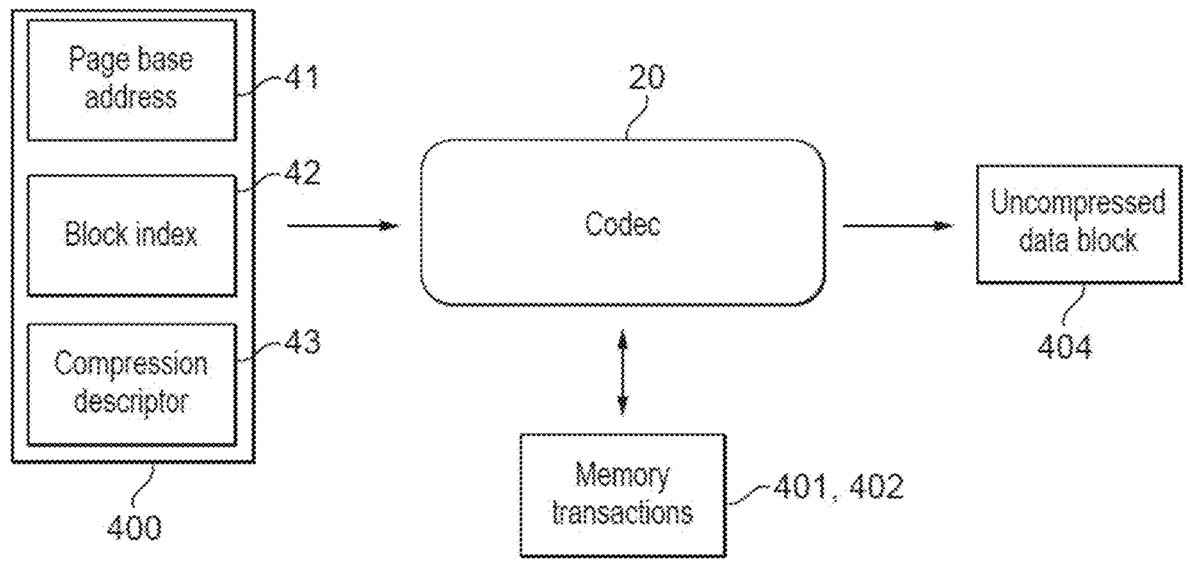
FIGS. 7C and 7D show schematically a compressed data read transaction process in accordance with embodiments.
Figure 7D:
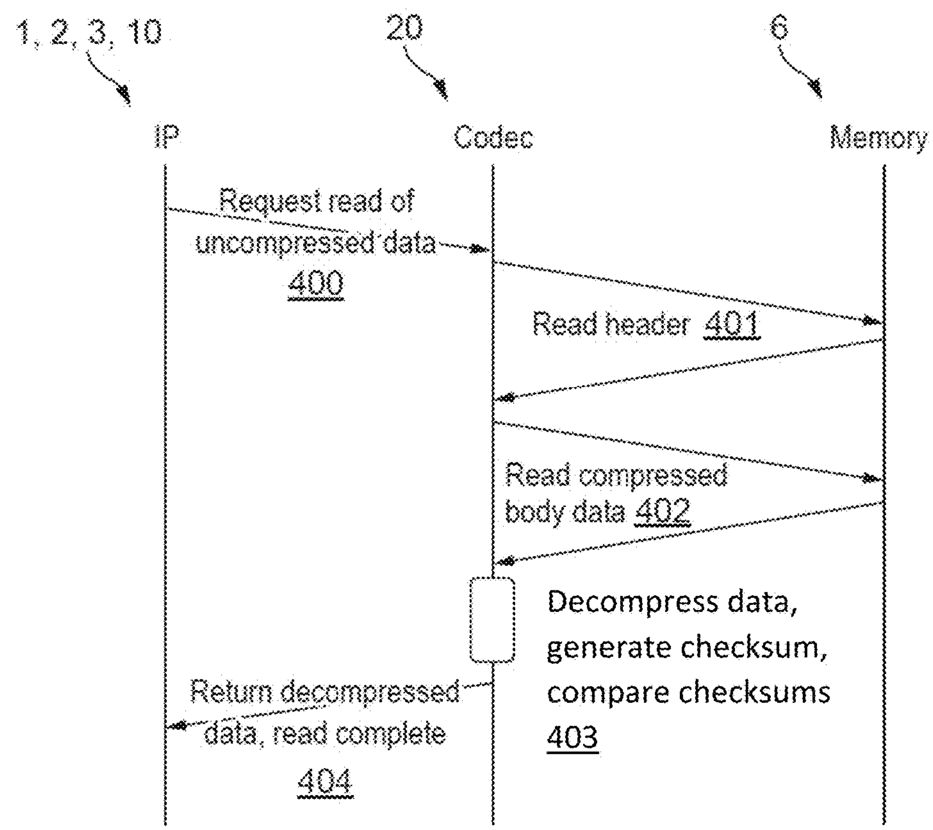

Then, as illustrated in FIGS. 7C and 7D, when a processing unit 1, 2, 3, 10 requires the data that is stored in the memory 6 in a compressed data block, the processing unit issues a read transaction request 400 on a read address channel of the bus 5 via its bus interface. This includes the processing unit issuing a "COMPRESSED" signal that indicates that the request relates to compressed data in the memory 6, and should trigger a bus transaction that involves the codec 20.

As shown in FIG. 7C, the read transaction request 400 further includes an indication 41, 42 of the memory address of the required compressed data block, and a compression descriptor 43. The memory address information may include an indication 41 of the location of header data for the compressed data block, and an indication 42 of the location of a block within body data associated with the header.

The compression descriptor 43 may be a signal vector that identifies the compression mechanism (codec) that the required data block is compressed in accordance with, and identifies the data format and data type in which the uncompressed data should be returned to the processing unit (e.g. RGB, RGBA, YUV, number of components, bits per component, whether data values are unsigned/signed integers, floating point numbers, etc.).

As shown in FIG. 7D, the codec 20 recognises and intercepts the request 400, reads 401 header information comprising the checksum for the required compressed data block from the memory 6 using the header memory address information 41, and then reads 402 the appropriate compressed data block using the body memory address information 42.

The codec then processes 403 the read data. The processing 403 involves the decoder 204 decompressing the read compressed data block in accordance with the compression descriptor information 43, and then the checksum module 205 generating a checksum from the decompressed data values generated by the decoder 204. This checksum is then compared with the checksum read from the header information by the checksum module 205, and the comparison is used to determine whether an error has occurred. The decompressed data may then be provided 404 to the processing unit 1, 2, 3, 10, and a signal may be issued to the processing unit 1, 2, 3, 10 on a read data channel of the bus 5 to indicate that the read transaction is complete.

Although the above has been described with reference to embodiments, other arrangements are possible.

Figure 8:
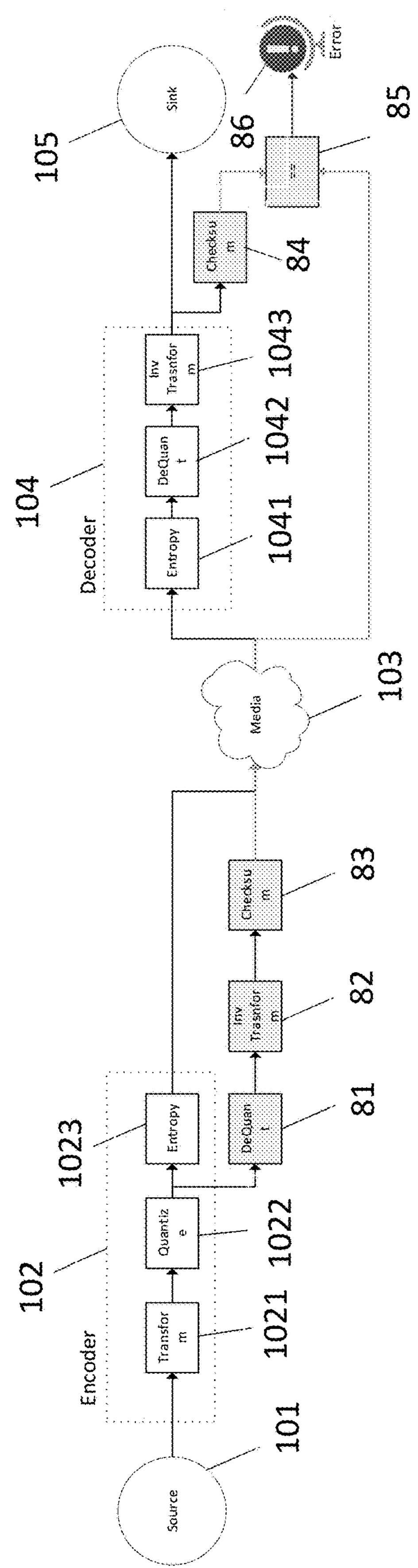
FIG. 8 shows schematically a checksum process in accordance with embodiments.

FIG. 8 illustrates embodiments in which image data is lossily compressed by being subjected to transformation 1021 (e.g. discrete cosine transformation (DCT), wavelet transformation, etc.) and quantization 1022, and the quantized data is subject to lossless entropy encoding 1023 for transmission. In this embodiment, the source-side checksum generation process is located (logically) after the lossy compression process 1021, 1022, but (logically) before the lossless compression process 1023. This can allow more of the data path to be included in the checksum process, e.g. as compared to the embodiment of FIG. 6.

As shown in FIG. 8, in these embodiments, uncompressed data values generated by source 101 (e.g. processing unit 1, 2, 10) are compressed by the encoder 102 (e.g. encoder 202) to produce compressed data. The uncompressed data values are lossily compressed by being subjected to transformation 1021 and quantization 1022, and the quantized data is entropy encoded 1023 for transmission.

The quantized data values are then dequantized 81 and subjected to the inverse transformation 82 to produce source-side decompressed data values, and a checksum 83 is generated from the source-side decompressed data values (e.g. by checksum module 205). The checksum and quantized data are entropy encoded 1023 and sent to sink 105 (e.g. processing unit 1, 2, 3, 10) via media 103 (e.g. interconnect 5 and memory 6).

After being transferred via media 103, the quantized data is recovered by entropy decoding 1041, and the quantized data is subjected to dequantization 1042, and the inverse transformation 1043 to produce decompressed data values, and the checksum is re-generated 84 from the decompressed data values (e.g. by checksum module 205).

The checksum 84 generated from the sink-side decompressed data values is then compared 85 with the checksum 83 generated from the source-side decompressed data values (e.g. by checksum module 205), and the comparison 85 is used to determine whether an error 86 has occurred. It is determined that an error 86 has occurred when the checksum 84 generated from the sink-side decompressed data values is not equal to the checksum 83 generated from the source-side decompressed data values.

Figure 9:
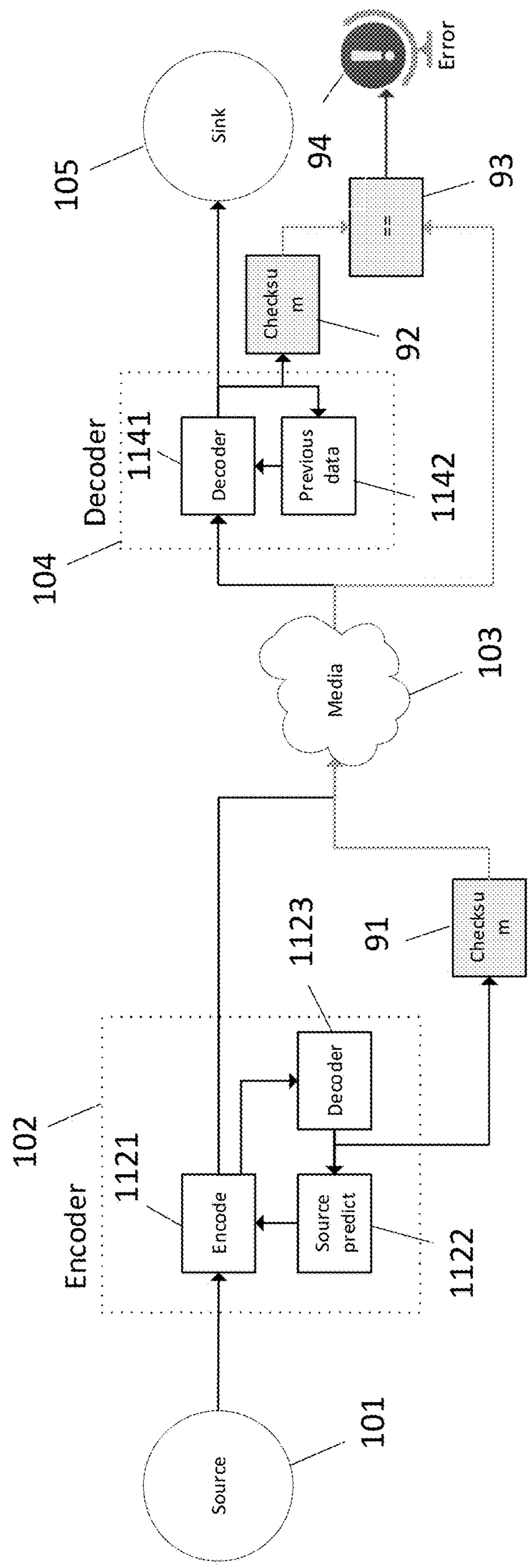
FIG. 9 shows schematically a checksum process in accordance with embodiments.

FIG. 9 illustrates embodiments in which video data is compressed by delta encoding, in which residuals representing differences between a current frame and a previous reconstructed frame are encoded. As illustrated in FIG. 9, the encoding process involves decoding a previous frame 1123, determining residuals 1122, and encoding 1121 the residuals. In this case, the source-side checksum generation process uses the results of the encoder decoding process 1123, and the source-side decompressed data values are thus, in effect, obtained for "free" as part of the encoding process.

As shown in FIG. 9, a checksum is generated 91 from the source-side decompressed data values that are generated (e.g. by checksum module 205) as part of the encoding process. The checksum and compressed data are transferred to sink 105 (e.g. processing unit 1, 2, 3, 10) via media 103 (e.g. interconnect 5 and memory 6). The compressed data is decompressed by decoder 104 (e.g. decoder 204) to produce "sink-side" decompressed data values, and the checksum is re-generated 92 from the sink-side decompressed data values (e.g. by checksum module 205).

The checksum 92 generated from the sink-side decompressed data values is then compared 93 with the checksum 91 generated from the source-side decompressed data values, and the comparison 93 is used to determine whether an error 94 has occurred (e.g. by checksum module 205).

Although the above describes generating and comparing a checksum, other forms of representative data could be used, such as hash values, etc.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A method of operating a data processing system that comprises:

an encoder operable to compress data; and a communication system operable to transfer data compressed by the encoder;

the method comprising:

the encoder compressing data to produce compressed data;

decompressing compressed data produced by the encoder to produce first decompressed data;

generating a first signature representative of the first decompressed data;

the communication system transferring compressed data produced by the encoder;

decompressing compressed data that has been transferred by the communication system to produce second decompressed data;

generating a second signature representative of the second decompressed data;

comparing the first signature and the second signature; and using the comparison to determine whether an error has occurred.

2. The method of claim 1, wherein the encoder compressing data comprises the encoder lossily compressing the data.

3. The method of claim 1, wherein the encoder compressing data comprises:

the encoder lossily compressing the data to produce lossily compressed data, and then losslessly compressing the lossily compressed data; and wherein decompressing compressed data produced by the encoder to produce first decompressed data, and generating a first signature representative of the first decompressed data comprises:

decompressing the lossily compressed data to produce lossily decompressed data, and generating the first signature to be representative of the lossily decompressed data.

4. The method of claim 3, wherein lossily compressing the data comprises transforming the data to produce transformed data, and then quantizing the transformed data; and wherein losslessly compressing the lossily compressed data comprises entropy encoding the quantized data.

5. The method of claim 1, wherein the encoder compressing data comprises the encoder performing the step of decompressing compressed data produced by the encoder.

6. The method of claim 5, wherein the encoder is a video encoder operable to compress video data by decompressing a previous encoded frame, and comparing a current frame with the decompressed previous encoded frame.

7. The method of claim 1, comprising the communication system transferring the first signature together with the compressed data produced by the encoder.

8. The method of claim 7, wherein transferring the first signature together with the compressed data produced by the encoder comprises storing the first signature in a header, and storing the compressed data as associated body data.

9. The method of claim 1, wherein the data processing system comprises one or more processing units, the communication system comprises a communication bus and a memory, and the method comprises:

in response to a processing unit of the one or more processing units issuing a write transaction request on the bus:

the encoder compressing data generated by the processing unit to produce compressed data;

decompressing compressed data produced by the encoder to produce the first decompressed data;

generating the first signature representative of the first decompressed data; and storing compressed data produced by the encoder and the first signature in the memory; and in response to a processing unit of the one or more processing units issuing a read transaction request on the bus:

reading the compressed data and the first signature stored in the memory;

decompressing the read compressed data to produce the second decompressed data;

generating the second signature representative of the second decompressed data;

comparing the first signature and the second signature; and using the comparison to determine whether an error has occurred.

10. A data processing system comprising:

an encoder operable to compress data; and a communication system operable to transfer data compressed by the encoder;

wherein the data processing system is operable to:

decompress compressed data produced by the encoder to produce first decompressed data;

generate a first signature representative of the first decompressed data;

decompress compressed data that has been transferred by the communication system to produce second decompressed data;

generate a second signature representative of the second decompressed data;

compare the first signature and the second signature; and use the comparison to determine whether an error has occurred.

11. The system of claim 10, wherein the encoder is operable to compress data by lossily compressing the data.

12. The system of claim 10, wherein the encoder is operable to compress data by:

lossily compressing the data to produce lossily compressed data, and then losslessly compressing the lossily compressed data; and wherein the system is operable to decompress compressed data produced by the encoder to produce first decompressed data, and generate a first signature representative of the first decompressed data by:

decompressing the lossily compressed data to produce lossily decompressed data, and generating the first signature to be representative of the lossily decompressed data.

13. The system of claim 12, wherein lossily compressing the data comprises transforming the data to produce transformed data, and then quantizing the transformed data; and wherein losslessly compressing the lossily compressed data comprises entropy encoding the quantized data.

14. The system of claim 10, wherein the encoder is operable to compress data by decompressing compressed data produced by the encoder.

15. The system of claim 14, wherein the encoder is a video encoder operable to compress video data by decompressing a previous encoded frame, and comparing a current frame with the decompressed previous encoded frame.

16. The system of claim 10, wherein the communication system is operable to transfer the first signature together with compressed data produced by the encoder.

17. The system of claim 16, wherein the communication system is operable to transfer the first signature together with compressed data produced by the encoder by storing the first signature in a header, and storing the compressed data as associated body data.

18. The system of claim 10, wherein the data processing system comprises one or more processing units, the communication system comprises a communication bus and a memory, and the system is operable to:

in response to a processing unit of the one or more processing units issuing a write transaction request on the bus:

compress, by the encoder, data generated by the processing unit to produce compressed data;

decompress compressed data produced by the encoder to produce the first decompressed data;

generate the first signature representative of the first decompressed data; and store compressed data produced by the encoder and the first signature in the memory; and in response to a processing unit of the one or more processing units issuing a read transaction request on the bus:

read the compressed data and the first signature stored in the memory;

decompress the read compressed data to produce the second decompressed data;

generate the second signature representative of the second decompressed data;

compare the first signature and the second signature; and use the comparison to determine whether an error has occurred.

19. A non-transitory computer readable storage medium storing software code which when executing on a processor performs a method of operating a data processing system that comprises:

an encoder operable to compress data; and a communication system operable to transfer data compressed by the encoder;

the method comprising:

the encoder compressing data to produce compressed data;

decompressing compressed data produced by the encoder to produce first decompressed data;

generating a first signature representative of the first decompressed data;

the communication system transferring compressed data produced by the encoder;

decompressing compressed data that has been transferred by the communication system to produce second decompressed data;

generating a second signature representative of the second decompressed data;

comparing the first signature and the second signature; and using the comparison to determine whether an error has occurred.

* * * * *